US011258628B2

(12) United States Patent
Dev et al.

(10) Patent No.: US 11,258,628 B2
(45) Date of Patent: Feb. 22, 2022

(54) PLUG AND PLAY AT SITES USING TLOC-EXTENSION

(71) Applicant: Cisco Technology, Inc., San Jose, CA (US)

(72) Inventors: Kapil Dev, San Jose, CA (US); David Mark Carrel, Tiburon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 90 days.

(21) Appl. No.: 16/682,797

(22) Filed: Nov. 13, 2019

(65) Prior Publication Data

US 2020/0403821 A1    Dec. 24, 2020

Related U.S. Application Data

(60) Provisional application No. 62/865,720, filed on Jun. 24, 2019.

(51) Int. Cl.

| | |
|---|---|
| *H04W 56/00* | (2009.01) |
| *H04L 12/28* | (2006.01) |
| *H04L 61/2514* | (2022.01) |
| *H04L 29/06* | (2006.01) |
| *H04L 12/46* | (2006.01) |
| *H04L 49/45* | (2022.01) |
| *H04L 49/15* | (2022.01) |
| *H04L 49/20* | (2022.01) |
| *H04L 49/351* | (2022.01) |
| *H04L 45/64* | (2022.01) |

(52) U.S. Cl.
CPC ...... *H04L 12/2858* (2013.01); *H04L 12/4633* (2013.01); *H04L 45/64* (2013.01); *H04L 49/15* (2013.01); *H04L 49/20* (2013.01); *H04L 49/351* (2013.01); *H04L 49/45* (2013.01); *H04L 61/2514* (2013.01); *H04L 63/0272* (2013.01)

(58) Field of Classification Search
CPC ..... H04L 12/4633; H04L 45/64; H04L 49/15; H04L 49/20; H04L 49/351; H04L 49/45; H04L 61/2514; H04L 63/0272
USPC ....................................................... 370/242
See application file for complete search history.

(56) References Cited

U.S. PATENT DOCUMENTS

| | | | |
|---|---|---|---|
| 2017/0279710 A1* | 9/2017 | Khan | H04L 45/748 |
| 2019/0036770 A1* | 1/2019 | Bhau | H04L 41/0806 |
| 2020/0404573 A1* | 12/2020 | Athlur | H04W 12/033 |

OTHER PUBLICATIONS

NPL search history (Year: 2021).*

(Continued)

*Primary Examiner* — Sai Ming Chan
(74) *Attorney, Agent, or Firm* — Baker Botts, LLP (57) ABSTRACT

According to some embodiments, a method performed by a first software defined wide area network (SD-WAN) edge router communicably coupled to a public network comprises: receiving a transport location (TLOC)-extension configuration for a known interface of the first edge router; detecting a second edge router attempting to connect to the known interface of the first edge router; and transmitting, to the second edge router, configuration information for the second edge router so that the second edge router is able to communicate with the public network through a TLOC-extension with the first edge router. In some embodiments, the second edge router receives device configuration information (e.g., PnP, ZTP, etc.) from the public network via the TLOC-extension.

18 Claims, 3 Drawing Sheets

(56) References Cited

OTHER PUBLICATIONS

Jean-Marc Barozet, "Cisco SDWAN Deep Dive," XP055735816, Dec. 2, 2017, (www.sccug.net/wp-content/uploads/2019/05/Cisco-SDWAN-Deep-Dive.pdf), 185 total pages.
PCT Search Report in International Application No. PCT/US2020/036733, dated Oct. 12, 2020, 16 pages.
"Plug and Play: How Simple Is Your SD-WAN Solution?" Posted by Talari (https://www.talari.com/blog/author/marketingtalari.com/); https://www.talari.com/blog/plug-play-simple-sd-wan-solution/; document dated Jan. 11, 2017; downloaded Nov. 11, 2019; 7 pages.

* cited by examiner

PLUG AND PLAY AT SITES USING TLOC-EXTENSION

RELATED APPLICATIONS

This application claims priority to U.S. Provisional Application Ser. No. 62/865,720 entitled "Plug and Play at Sites Using TLOC-Extension," filed Jun. 24, 2019, the entire content of which is incorporated herein by reference.

TECHNICAL FIELD

This disclosure generally relates to software defined networking in a wide area network (SD-WAN), and more specifically to onboarding SDWAN edge devices into an existing network using Plug and Play (PnP) or zero touch provisioning (ZTP) when cloud connectivity is provided through transport location (TLOC) extension.

BACKGROUND

Traditional wide area network (WAN) architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures are limited in available bandwidth, security, and complexity management, which may hinder a business's productivity.

Software defined networking in a WAN (SD-WAN) simplifies the management and operation of a WAN by decoupling the networking hardware from its control mechanism. Advantages include reducing costs with transport independence across multiple technologies, improving business application performance and increasing agility, optimizing the user experience and efficiency for SaaS and public cloud applications, and simplifying operations with automation and cloud-based management.

An SDWAN edge router provides secure data plane connectivity among sites, such as branch sites and datacenters, over one or more WAN transports. The edge router is responsible for traffic forwarding, security, encryption, Quality of Service (QoS), routing protocols, etc.

A common network configuration at a site with two SDWAN edge routers is that each SDWAN edge router is connected to one transport. Links between the edge routers facilitate each edge router to access the opposite transport through a TLOC-extension interface on the neighboring edge router. For example, one edge router may connect directly to a MPLS transport and may use a TLOC extension interface on a second edge router to connect to a public-internet transport.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

According to some embodiments, a method performed by a first software defined wide area network (SD-WAN) edge router communicably coupled to a public network comprises: receiving a transport location (TLOC)-extension configuration for a known interface of the first edge router; detecting a second edge router attempting to connect to the known interface of the first edge router; and transmitting, to the second edge router, configuration information for the second edge router so that the second edge router is able to communicate with the public network through a TLOC-extension with the first edge router.

In particular embodiments, the method further comprises, upon detecting a second edge router attempting to connect to the known interface of the first edge router, performing authentication (e.g., 802.1x port-based authentication) on the second edge router to verify the second edge router is authorized to connect to the first edge router.

In particular embodiments, the configuration information for the second edge router comprises TLOC-extension information for establishing a TLOC-extension between the first and second edge routers.

In particular embodiments, receiving the TLOC-extension configuration for the known interface comprises receiving the TLOC-extension configuration from a SD-WAN controller.

According to some embodiments, a method performed by a second SD-WAN edge router comprises: connecting to a known interface of a first SD-WAN edge router that is communicably coupled to a public network; receiving, from the first edge router, configuration information for a TLOC-extension with the first edge router; establishing the TLOC-extension with the first edge router; and receiving device configuration information (e.g., PnP, ZTP, etc.) from the public network via the TLOC-extension.

In particular embodiments, connecting to the known interface of the first edge router comprises performing authentication (e.g., 802.1x port-based authentication) to verify the second edge router is authorized to connect to the first edge router.

In particular embodiments, the method further comprises receiving an identifier of the known interface from a SD-WAN controller.

According to some embodiments, an SD-WAN edge router comprises one or more network interfaces, a memory comprising instructions, and a hardware processor. The edge router, when executing the instructions at the hardware processor, is configured to perform any of the edge router methods described above.

Example Embodiments

This disclosure generally relates to Zero Touch Provisioning (ZTP) or Plug and Play (PnP) on existing or new sites for software-defined wide area networks (SD-WANs), and more specifically to onboarding or replacing an edge device (e.g., a device that provides an entry point into enterprise or service provider core networks), or any other device on the network, without involving a staging facility or disrupting the existing network.

An SD-WAN uses a transport location (TLOC) to uniquely identify a circuit interface to control plane and data plane information. TLOC-Extension facilitates extension of a TLOC over a tunnel to another router in a branch. A problem with existing SD-WANs is that ZTP or PnP is not supported when using TLOC-Extension because the TLOC properties of extended sites are static.

In general, SD-WAN edge devices may be deployed in a site with public (e.g., Internet) and/or private (e.g., multi-protocol label switched (MPLS)) networks. TLOC-extension (e.g., Viptela SD-WAN Feature) extends the network for both public and private networks. One edge device is connected to the public network and another edge device is connected to the private network and both edge devices may be connected together using TLOC-Extension. The circuit (public or private) is connected to the individual edges. If one device or circuit goes down, the circuit connected to that is lost to the other edge as well.

When adding a new edge device to the network, ZTP or PnP may be used to onboard the device into an existing network. PnP uses a public internet connection because PnP services are hosted on the cloud. Thus, PnP needs a directly connected public internet interface.

If internet connectivity to the edge is provided through TLOC-Extension, the above scenario may fail. This impedes at least two major scenarios: (a) recovery of the site using software reset; and (b) return material authorization (RMA) of a device at a branch office.

With the redundancy model of multi-homed sites, TLOC-Extension is a common deployment strategy. This means that having all recovery methods ready and functioning is paramount. PnP and ZTP fall in this critical path and need to be supported over the TLOC-Extension topology. An example is illustrated in FIG. 1.

Figure 1:
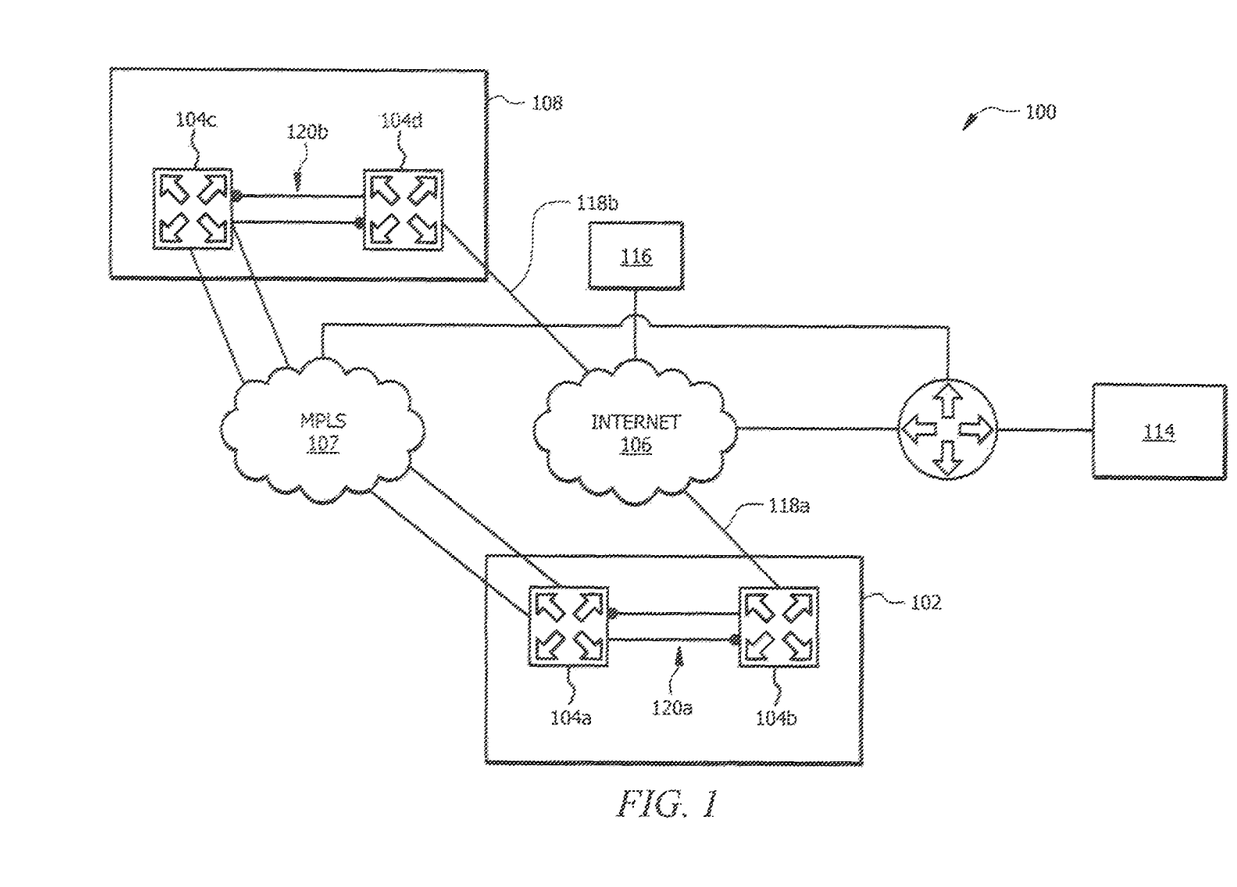
FIG. 1 is network diagram illustrating a typical SD-WAN topology.

FIG. 1 is network diagram illustrating a typical SD-WAN topology. SD-WAN 100 includes one or more branch sites 102 (e.g., satellite offices, retail locations, storage facilities, etc.), one or more aggregation sites 108 (e.g., datacenter, etc.), and SD-WAN controller 114.

Each branch site 102 includes one or more branch edge routers 104. Branch site 102 may include a single branch edge router 104 or may include more than one branch edge router 104 for redundancy.

Each aggregation site 108 includes one or more aggregation edge routers 104. The aggregation edge routers 104 connect with one or more branch edge routers 104 to provide network services to branch sites 102. Aggregation edge routers 104 connect to one or more branch edge routers 104 via one or more networks 106 and/or 107.

The branch edge routers and aggregation edge routers may generally be referred to as an edge router. Edge router 104 may comprise hardware and software components described in more detail with respect to FIG. 4.

SD-WAN controller 114 creates and manages software defined network connections 118 over networks 106 and/or 107 to connect aggregation edge routers 104 and branch edge routers 104. Although SD-WAN controller 114 is illustrated as a single logical component, SD-WAN controller 114 may comprise multiple network components.

Networks 106 and 107 comprise any type of network that facilitates communication between components of SD-WAN 100. Networks 106 and 107 may connect one or more components of SD-WAN 100. One or more portions of network 106 may include an ad-hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Each of networks 106 and 107 may include one or more networks. One or more components of SD-WAN 100 may communicate over networks 106 and 107. Networks 106 and 107 may include a core network (e.g., the Internet), an access network of a service provider, an Internet service provider (ISP) network, and the like. One or more portions of networks 106 and 107 may use SD-WAN technology. In the illustrated example, network 106 represents a public network, such as a public internet, and network 107 represents a private network, such as an MPLS network.

SD-WAN network 100 may include provisioning server 116. Provisioning server 116 may provide device configuration services, such a PnP, ZTP, etc., to other components of SD-WAN network 100, such as edge routers 104.

At branch site 102, edge router 104b is connected to public network 106. TLOC-extension 120a between edge router 104a and 104b provides edge router 104a access to public network 106. At aggregation site 108, edge router 104d is connected to public network 106. TLOC-extension 120b between edge router 104c and 104d provides edge router 104c access to public network 106.

When adding a new edge device 104 to a site, such as branch site 102 or aggregation site 108, it is desirable to use a device configuration service, such as PnP or ZTP, to onboard the new edge device 104. At initial turnup, however, new edge device 104 is not configured with TLOC-extension 120, and thus does not have access to public network 106. Therefore, new edge device 104 cannot access the device configuration service.

Particular embodiments obviate one or more of the problems described above. Particular embodiments include a method at a network device, such as an SD-WAN edge router.

For example, in some embodiments an existing edge router (i.e., edge router already on site an in service) may be configured via a network management system, such as Viptela vManage, with TLOC-Extension on a particular interface.

The particular interface may be a known interface. A known interface refers to a predetermined interface that is known to a new edge router. The known interface may be determined based on a specification or may be configured by a network operator.

The existing edge router (such as edge router 104b or 104d illustrated in FIG. 1) detects that a new edge router (such as edge router 104a or 104c illustrated in FIG. 1) is trying to connect on the particular TLOC-Extension interface.

For security, some embodiments may use 802.1X port-based security so that only designated devices are able to connect on the particular interface. Other embodiments may use any suitable authorization protocol.

The existing edge router gives IP and gateways on the particular interface to the new edge router. The new edge router is then able to contact the PnP and/or ZTP servers via the existing edge router.

Particular embodiments include one or more of the following advantages. Particular embodiments facilitate plugging a new device to an existing site with ZTP even with one internet exit circuit. Existing site will be up all the time when this operation is performed, resulting in no downtime for the site. For example, using particular embodiments, it is not necessary to disconnect an existing edge router from the public network so that a new device can be connected to the public network for PnP/ZTP configuration. Additionally, in instances where configuration databases get corrupted, ZTP/PnP may be the only recovery solution. RMA or replacement of an existing edge device is simplified and does not involve a staging facility.

Figure 2:
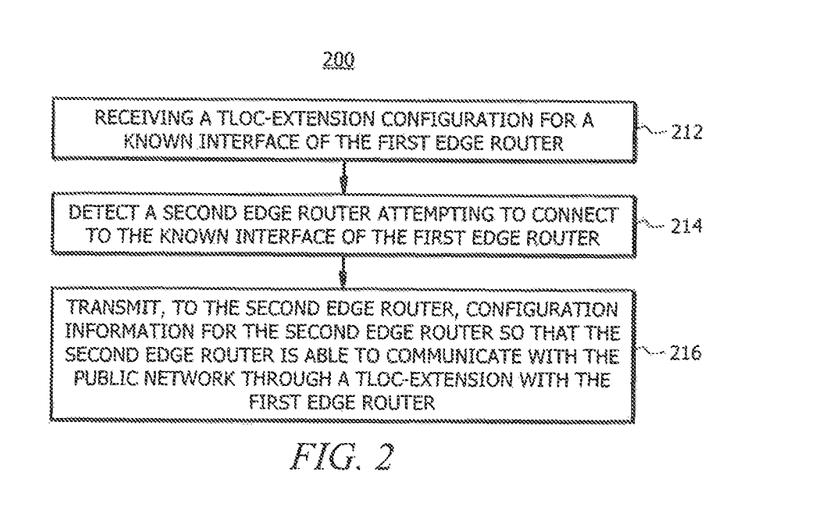
FIG. 2 is a flow diagram illustrating an example method in a SD-WAN edge router.

FIG. 2 is a flow diagram illustrating an example method in a SD-WAN edge router. The SD-WAN edge router is connected to a public network. The steps of method 200 in FIG. 2 may be performed by SD-WAN edge router 104 of SD-WAN network 100 illustrated in FIG. 1.

The method begins at step 212, where the edge router receives a TLOC-extension configuration for a known interface of the edge router. For example, edge router 104b may receiving TLOC-extension configuration from SD-WAN controller 114. The TLOC-extension configuration may configure a TLOC-extension on a known port of edge router 104b.

At step 214, the edge router detects a second edge router attempting to connect to the known interface of the edge router. For example, edge router 104a may be attempting to connect to the known port of edge router 104b.

In some embodiments, the edge router may perform authentication on the second edge router to verify the second edge router is authorized to connect to the first edge router. For example, edge router may use 802.1x port-based authentication to verify that edge router 104a is authorized to connect to edge router 104b.

At step 216, the edge router transmits, to the second edge router, configuration information for the second edge router so that the second edge router is able to communicate with the public network through a TLOC-extension with the first edge router. For example, edge router 104b may transmit configuration information to edge router 104a. Edge router 104a may use the configuration information to establish the TLOC-extension with edge router 104b, thus providing edge router 104a access to public network 106 via edge router 104b.

Modifications, additions, or omissions may be made to method 200 depicted in FIG. 2. Method 200 may include more, fewer, or other steps. Additionally, steps may be performed in parallel or in any suitable order.

Figure 3:
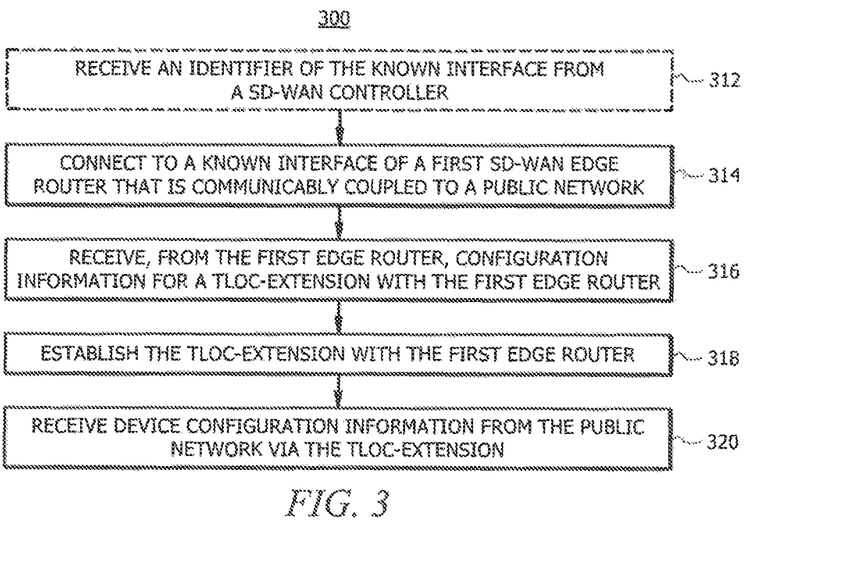
FIG. 3 is a flow diagram illustrating another example method in a SD-WAN edge router.

FIG. 3 is a flow diagram illustrating an example method in a SD-WAN edge router. The steps of method 300 in FIG. 3 may be performed by SD-WAN edge router 104 of SD-WAN network 100 illustrated in FIG. 1.

The method may begin at step 312, where the edge router receives an identifier of a known interface from a SD-WAN controller. For example, edge router 104a may receive an identifier of a port on edge router 104b from SD-WAN controller 116. In other embodiments, the edge router may receive the identifier of the known port from another network management entity, or the edge router may be preconfigured with the known port. The edge router may be preconfigured based on a standard, or based a network operator preference.

At step 314, the edge router connects to the known interface of a first SD-WAN edge router that is communicably coupled to a public network. For example, edge router 104a may connect to the known interface of edge router 104b.

In some embodiments, connecting to the known interface of the first edge router comprises performing authentication (e.g., 802.1x port authorization) to verify the second edge router is authorized to connect to the first edge router.

At step 316, the edge router receives, from the first edge router, configuration information for a TLOC-extension with the first edge router. For example, edge router 104a may receive from edge router 104b configuration information enabling edge router 104a to establish a TLOC-extension with edge router 104b. At step 318, the edge router establishes the TLOC-extension with the other edge router.

At step 320, the edge router receives device configuration information from the public network via the TLOC-extension. For example, edge router 104a may receive PnP or ZTP information from device configuration server 116 on public network 106 via the TLOC-extension with edge router 104b.

Modifications, additions, or omissions may be made to method 300 depicted in FIG. 3. Method 300 may include more, fewer, or other steps. Additionally, steps may be performed in parallel or in any suitable order.

Figure 4:
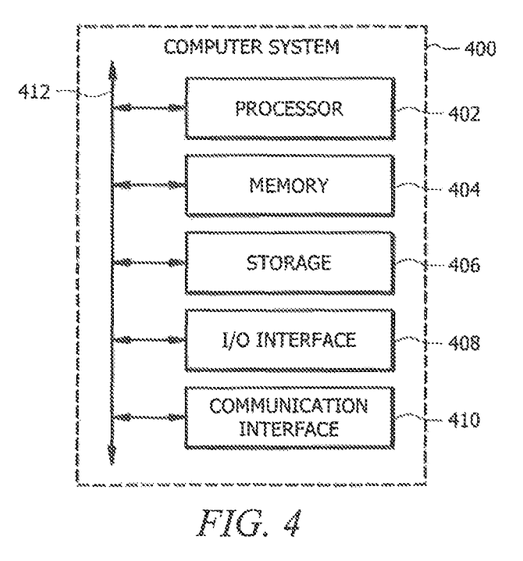
FIG. 4 is a block diagram illustrating an example edge router, according to particular embodiments.

FIG. 4 is a block diagram illustrating an example SD-WAN edge router, according to particular embodiments. An edge router may comprise aggregation edge routers 104 and/or branch edge routers 104 described with respect to FIG. 1.

In particular embodiments, one or more edge routers 400 perform one or more steps of one or more methods described or illustrated herein, such as the methods described with respect to FIGS. 2 and 3. In particular embodiments, one or more edge routers 400 provide functionality described or illustrated herein, such as the functionality described with respect to FIG. 1. In particular embodiments, software running on one or more edge routers 400 performs one or more steps of one or more methods described or illustrated herein or provides functionality described or illustrated herein. Particular embodiments include one or more portions of one or more edge routers 400. Herein, reference to an edge router may encompass a computing device, and vice versa, where appropriate. Moreover, reference to an edge router may encompass one or more edge routers, where appropriate.

Particular embodiments may include any suitable number of edge routers 400. Edge router 400 may take any suitable physical form. As example and not by way of limitation, edge router 400 may comprise an embedded computer system, a system-on-chip (SOC), a single-board computer system (SBC)(such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, edge router 400 may include one or more edge routers 400; be unitary or distributed; span multiple locations; span multiple machines; span multiple data centers; or reside in a cloud, which may include one or more cloud components in one or more networks.

Where appropriate, one or more edge routers 400 may perform without substantial spatial or temporal limitation one or more steps of one or more methods described or illustrated herein. As an example and not by way of limitation, one or more edge routers 400 may perform in real time or in batch mode one or more steps of one or more methods described or illustrated herein. One or more edge routers 400 may perform at different times or at different locations one or more steps of one or more methods described or illustrated herein, where appropriate.

In particular embodiments, edge router 400 includes a processor 402, memory 404, storage 406, an input/output (I/O) interface 408, a communication interface 410, and a bus 412. Although this disclosure describes and illustrates a particular edge router having a particular number of particular components in a particular arrangement, particular embodiments may include any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. Processor 402 may include any suitable number of any suitable internal caches, where appropriate.

As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402.

In particular embodiments, processor 402 may include one or more internal registers for data, instructions, or addresses. Processor 402 may include any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, particular embodiments may include any suitable processor.

In particular embodiments, memory 404 includes main memory for storing instructions for processor 402 to execute or data for processor 402 to operate on. As an example and not by way of limitation, network node 400 may load instructions from storage 406 or another source (such as, for example, another computer system 400) to memory 404. Processor 402 may then load the instructions from memory 404 to an internal register or internal cache.

To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 404 may include one or more memories 404, where appropriate. Although this disclosure describes and illustrates particular memory, particular embodiments may include any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to network node 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 406 may take any suitable physical form.

Storage 406 may include one or more storage control units facilitating communication between processor 402 and storage 406, where appropriate. Where appropriate, storage 406 may include one or more storages 406. Although this disclosure describes and illustrates particular storage, particular embodiments may include any suitable storage.

In particular embodiments, I/O interface 408 includes hardware, software, or both, providing one or more interfaces for communication between edge router 400 and one or more I/O devices. Edge router 400 may include one or more of these I/O devices, where appropriate. One or more of these I/O devices may enable communication between a person and edge router 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, particular embodiments may include any suitable I/O interface. In particular embodiments, I/O interface 408 may include an interface to a remote network management system.

In particular embodiments, communication interface 410 includes hardware, software, or both providing one or more interfaces for communication (such as, for example, packet-based communication) between edge router 400 and one or more other edge routers 400 or one or more networks. As an example and not by way of limitation, communication interface 410 may include a network interface controller (NIC) or network adapter for communicating with an Ethernet or other wire-based network or a wireless NIC (WNIC)

or wireless adapter for communicating with a wireless network, such as a WI-FI network.

Particular embodiments may include any suitable network and any suitable communication interface 410 for it. As an example and not by way of limitation, edge router 400 may communicate with an ad hoc network, a personal area network (PAN), a LAN, WAN, MAN, or one or more portions of the Internet or a combination of two or more of these. One or more portions of one or more of these networks may be wired or wireless. As an example, edge router 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Edge router 400 may include any suitable communication interface 410 for any of these networks, where appropriate. Communication interface 410 may include one or more communication interfaces 410, where appropriate. Although this disclosure describes and illustrates a particular communication interface, particular embodiments may include any suitable communication interface.

In particular embodiments, bus 412 includes hardware, software, or both coupling components of edge router 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs)(such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A method performed by a first software defined wide area network (SD-WAN) edge router communicably coupled to a public network, the method comprising:
   receiving a transport location (TLOC)-extension configuration for a known interface of the first edge router;
   detecting a second edge router attempting to connect to the known interface of the first edge router; and
   transmitting, to the second edge router, configuration information for the second edge router so that the second edge router is able to communicate with the public network through a TLOC-extension with the first edge router, wherein the configuration information for the second edge router comprises TLOC-extension information for establishing a TLOC-extension between the first and second edge routers.

2. The method of claim 1, further comprising upon detecting the second edge router attempting to connect to the known interface of the first edge router, performing authentication on the second edge router to verify the second edge router is authorized to connect to the first edge router.

3. The method of claim 2, wherein the authentication comprises 802.1x port-based authentication.

4. The method of claim 1, wherein receiving the TLOC-extension configuration for the known interface comprises receiving the TLOC-extension configuration from a SD-WAN controller.

5. A method performed by a second software defined wide area network (SD-WAN) edge router, the method comprising:
   connecting to a known interface of a first SD-WAN edge router that is communicably coupled to a public network;
   receiving, from the first edge router, configuration information for a transport location (TLOC)-extension with the first edge router;
   establishing the TLOC-extension with the first edge router; and
   receiving device configuration information from the public network via the TLOC-extension.

6. The method of claim 5, wherein connecting to the known interface of the first edge router comprises performing authentication to verify the second edge router is authorized to connect to the first edge router.

7. The method of claim 6, wherein the authentication comprises 802.1x port-based authentication.

8. The method of claim 5, wherein receiving the device configuration information from the public network comprises receiving plug-and-play (PnP) information or zero touch provisioning (ZTP) information.

9. The method of claim 5, further comprising receiving an identifier of the known interface from a SD-WAN controller.

10. A first software defined wide area network (SD-WAN) edge router communicably coupled to a public network, the first edge router comprising:
one or more network interfaces;
a memory comprising instructions; and
a hardware processor;
wherein the edge router, when executing the instructions at the hardware processor, is configured to:
receive a transport location (TLOC)-extension configuration for a known interface of the first edge router;
detect a second edge router attempting to connect to the known interface of the first edge router; and
transmit, to the second edge router, configuration information for the second edge router so that the second edge router is able to communicate with the public network through a TLOC-extension with the first edge router, wherein the configuration information for the second edge router comprises TLOC-extension information for establishing a TLOC-extension between the first and second edge routers.

11. The edge router of claim 10, further operable to, upon detecting the second edge router attempting to connect to the known interface of the first edge router, perform authentication on the second edge router to verify the second edge router is authorized to connect to the first edge router.

12. The edge router of claim 11, wherein the authentication comprises 802.1x port-based authentication.

13. The edge router of claim 10, wherein the hardware processor is configured to receive the TLOC-extension configuration for the known interface by receiving the TLOC-extension configuration from a SD-WAN controller.

14. A second software defined wide area network (SD-WAN) edge router, the second edge router comprising:
one or more network interfaces;
a memory comprising instructions; and
a hardware processor;
wherein the edge router, when executing the instructions at the hardware processor, is configured to:
connect to a known interface of a first SD-WAN edge router that is communicably coupled to a public network;
receive, from the first edge router, configuration information for a transport location (TLOC)-extension with the first edge router;
establish the TLOC-extension with the first edge router; and
receive device configuration information from the public network via the TLOC-extension.

15. The edge router of claim 14, wherein the hardware processor is further configured to connect to the known interface of the first edge router by performing authentication to verify the second edge router is authorized to connect to the first edge router.

16. The edge router of claim 15, wherein the authentication comprises 802.1x port-based authentication.

17. The edge router of claim 14, wherein the hardware processor is configured to receive the device configuration information from the public network by receiving plug-and-play (PnP) information or zero touch provisioning (ZTP) information.

18. The edge router of claim 14, the hardware processor further configured to receive an identifier of the known interface from a SD-WAN controller.

* * * * *